United States Patent [19]
Peng et al.

[11] Patent Number: 5,893,931
[45] Date of Patent: Apr. 13, 1999

[54] LOOKASIDE BUFFER FOR ADDRESS TRANSLATION IN A COMPUTER SYSTEM

[75] Inventors: Leon Kuo-Liang Peng, Mountain View; Yolin Lih, San Jose; Chih-Wei David Chang, Saratoga, all of Calif.

[73] Assignee: Fujitsu Limited, Tokyo, Japan

[21] Appl. No.: 08/783,967

[22] Filed: Jan. 15, 1997

Related U.S. Application Data

[63] Continuation of application No. 08/397,809, Mar. 3, 1995, Pat. No. 5,680,566.

[51] Int. Cl.$^6$ .................................................. G06F 12/10
[52] U.S. Cl. .............................. 711/206; 711/207
[58] Field of Search ............................ 711/203, 206, 711/207

[56] References Cited

U.S. PATENT DOCUMENTS

| | | | |
|---|---|---|---|
| 4,473,878 | 9/1984 | Zolnowsky et al. | 711/208 |
| 4,611,272 | 9/1986 | Lomet | 707/3 |
| 4,628,451 | 12/1986 | Sawada et al. | 711/206 |
| 4,736,287 | 4/1988 | Druke et al. | 711/128 |
| 4,792,897 | 12/1988 | Gotou et al. | 711/207 |

(List continued on next page.)

FOREIGN PATENT DOCUMENTS

| | | |
|---|---|---|
| 0 453 707 | 1/1991 | European Pat. Off. . |
| WO 94 27222 | 11/1994 | WIPO . |

OTHER PUBLICATIONS

D. Comer: "The Ubiquitous B-Tree" ACM Computing Surveys, vol. 11, No. 2, Jun. 1979, pp. 121-137, XP002066573.

J.-L. Baer: "Concurrent Accesses of B-Trees in a Paging Environment" Proceedings of the 1978 International Conference on Parallel Processing, 22—Aug. 15, 1978, New York, US, pp. 235-237, XP002066574.

"Software Table Look-Up Buffer for B-Tree Implementation" IBM Technical Disclosure Bulletin, vol. 30, No. 6, Nov. 1987, pp. 145/146 XP000021944.

W. Pugh: "Slow Optimally Balanced Search Strategies vs. Cached Fast Uniformly Balanced Strategies" Information Processing Letters, vol. 34, No. 5, May 1990, NL, pp. 251-254, XP002066575.

*Primary Examiner*—Jack A. Lane
*Attorney, Agent, or Firm*—Skjerven, Morrill, MacPherson, Franklin & Friel LLP; Norman R. Klivans

[57] ABSTRACT

A method and apparatus for performing address translation in a computer system supporting virtual memory by searching a translation lookaside buffer (TLB) and, possibly, a translation table held in memory and implemented as a B-tree data structure. The TLB is initially searched for a translation for a specified input address. If exactly one valid entry of the TLB stores a translation for the specified input address then the output address corresponding to the specified input address is determined from the contents of that entry. Otherwise, the translation table is searched for a translation for the specified input address. If two or more valid entries of the TLB store a translation for the specified input address then these entries are invalidated. If a search of the translation table is required then the method involves the retrieval from the translation table, and insertion into the TLB, of a translation for the specified input address and possibly one or more translations for other input addresses that are stored together with the translation for the specified input address in one node of the B-tree implementing the translation table. During the insertion into the TLB of a translation for a particular input address that was retrieved from the translation table it is determined if there is exactly one valid entry in the TLB that stores a translation for the particular input address. If so, then the translation retrieved from the memory is inserted into that entry, thereby avoiding the creation of multiple TLB entries for the same input address.

1 Claim, 11 Drawing Sheets

Microfiche Appendix Included
(8 Microfiche, 504 Pages)

U.S. PATENT DOCUMENTS

| | | | |
|---|---|---|---|
| 4,811,215 | 3/1989 | Smith | 395/390 |
| 4,827,419 | 5/1989 | Selby, III | 701/200 |
| 4,914,577 | 4/1990 | Stewart et al. | 711/207 |
| 4,985,828 | 1/1991 | Shimizu et al. | 711/209 |
| 4,989,134 | 1/1991 | Shaw | 707/206 |
| 5,091,846 | 2/1992 | Sachs et al. | 711/130 |
| 5,109,335 | 4/1992 | Watanabe | 711/3 |
| 5,148,533 | 9/1992 | Joyce et al. | 711/144 |
| 5,155,824 | 10/1992 | Edenfield et al. | 711/143 |
| 5,202,986 | 4/1993 | Nickel | 707/3 |
| 5,222,222 | 6/1993 | Mehring et al. | 711/207 |
| 5,222,223 | 6/1993 | Webb, Jr. et al. | 711/140 |
| 5,237,671 | 8/1993 | Freitas et al. | 711/207 |
| 5,247,666 | 9/1993 | Buckwold | 707/100 |
| 5,255,384 | 10/1993 | Sachs et al. | 711/207 |
| 5,263,080 | 11/1993 | Jones et al. | 379/88 |
| 5,301,287 | 4/1994 | Herrell et al. | 711/202 |
| 5,305,444 | 4/1994 | Becker et al. | 711/207 |
| 5,319,760 | 6/1994 | Mason et al. | 711/208 |
| 5,369,744 | 11/1994 | Fukushima et al. | 395/293 |
| 5,386,527 | 1/1995 | Bosshart | 711/3 |
| 5,388,215 | 2/1995 | Baker et al. | 395/200.59 |
| 5,426,750 | 6/1995 | Becker et al. | 711/207 |
| 5,479,627 | 12/1995 | Khalidi et al. | 711/205 |
| 5,493,660 | 2/1996 | DeLano et al. | 711/206 |
| 5,539,892 | 7/1996 | Reininger et al. | 711/207 |
| 5,544,357 | 8/1996 | Huei | 707/2 |
| 5,581,737 | 12/1996 | Dahlen et al. | 711/170 |

LOOKASIDE BUFFER FOR ADDRESS TRANSLATION IN A COMPUTER SYSTEM

This application is a continuation of application Ser. No. 08/397,809, filed Mar. 3, 1995, U.S. Pat. No. 5,680,566.

RELATED APPLICATIONS

The subject matter of this application is related to the subject matter of the following applications:

application Ser. Nos. 08/397,810 and 08/465,166 entitled "PARALLEL ACCESS MICRO-TLB TO SPEED UP ADDRESS TRANSLATION" filed on Mar. 3, 1995 by Chih-Wei David Chang, Kioumars Dawallu, Joel F. Boney, Ming-Ying Li and Jen-Hong Charles Chen;

application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

application Ser. No. 08/388,389 entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/518,549, a continuation of application Ser. No. 08/388,606 (now abandoned), entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/516,230, a continuation of application Ser. No. 08/388,364 (now abandoned), entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/522,567, a continuation of application Ser. No. 08/397,893 (now abandoned) entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/523,384, a continuation of application Ser. No. 08/397,891 (now abandoned) entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/524,294, a continuation of application Ser. No. 08/398,066 (now abandoned) entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/398,151 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ-MODIFY-WRITE ACCESS" filed on Mar. 3, 1995 by Chien Chen and Yizhi Lu;

each of the above applications having the same assignee as the present invention, and each incorporated herein by reference in their entirety.

CROSS REFERENCE TO MICROFICHE APPENDIX

Microfiche Appendix A consists of 8 sheets of 495 frames total of microfiche submitted under 37 C.F.R. § 1.96 and is a part of this disclosure. Microfiche Appendix A includes source and object code written in AIDA register transfer language specifying a translation lookaside buffer and a table walker in accordance with the present invention. In addition, Appendix A contains a functional specification document for the CAM portion of a translation lookaside buffer in accordance with the present invention.

BACKGROUND OF THE INVENTION

1. Field of The Invention

This disclosure relates to memory management units, in particular memory management units containing a lookaside buffer used to speed up translation in a computer system supporting virtual memory, and in particular, to methods for preventing and recovering from a situation where multiple translations in the buffer correspond to the same address. In addition, this disclosure relates to a particular data structure used to store translations, i.e. a B-tree, that is accessed when a requested translation is not present in the look-aside buffer.

2. Technical Background of the Invention

In computers supporting a virtual memory system, the address space to which programs refer is called "virtual memory" and each virtual address specified by a program instruction is translated by the memory management unit (MMU) to a physical or real address which is passed to the main memory subsystem (hereinafter referred to as "memory") in order to retrieve the accessed item. The use of virtual memory permits the size of programs to greatly exceed the size of the physical memory and provides flexibility in the placement of programs in the physical memory. For various reasons, including the need to keep tables required for address translation to a reasonable size, some virtual to real address translation schemes effect translation in two or more stages.

Usually, each stage of the translation requires one or more accesses to a table that is held in memory. In order to reduce the total number of memory accesses required per address translation, one or more translation-lookaside buffers (TLBs) are often provided in the MMU to reduce the average time required to effect a corresponding number of steps in the address translation scheme. A TLB is a cache-like memory, typically implemented in Static Random Accessible Memory (SRAM) and/or Content Addressible Memory (CAM), that holds translations corresponding to a particular stage of the translation scheme that have been recently fetched from memory.

Access to a TLB entry holding an output address corresponding to an input address obviates the need for and is typically many orders of magnitude faster than access to the in-memory table in order to retrieve the output address corresponding to the input address. (A TLB entry may contain fields describing the translation, in addition to an input and output address fields, such as a protection field. Furthermore, one or more fields used to determine the output address, instead of the output address itself, may be stored in the TLB entries.)

If the TLB does not contain the requested translation (i.e. upon a TLB "miss") then the MMU initiates a search of translation tables stored in memory for the requested translation and then loads it into the TLB, where it may be available for subsequent fast access should translation for the same input address be required at some future point. The part of the MMU performing this function, in hardware (logic circuitry), is hereinafter referred to as the "table walker".

Due to errors of various sorts such as soft errors in RAM, hardware transient errors and software errors, two or more translations for the same input address may appear in the TLB. It would be desirable for the MMU to detect that two or more translations exist in the TLB for the specified input address to be translated and to be able to recover from this anomalous situation by taking appropriate action such as invalidating the two or more translations and initiating a search by the table walker.

The input address range for the input to a particular stage of the address translation scheme in a computer system supporting virtual memory may be extremely large. For example, in a 64-bit workstation sold by HaL Computer Systems, Inc. (assignee of this disclosure), a 51 bit address is translated in the first stage. A simple array with one entry for each possible input address, as commonly used in the prior art (e.g. page table), is not a feasible solution, in terms of memory requirements, for implementing the translation table for such a large input address range.

Known data structures to implement the translation table have memory requirements proportional to the total number of possible input addresses rather than the number of input addresses that have been translated, and thus are not practical for very large input address spaces.

SUMMARY

A method for performing address translation in a computer system supporting virtual memory by searching a translation lookaside buffer (TLB) and, possibly, a translation table held in memory and implemented as a B-tree data structure is provided herein. In one embodiment, the size of each node is the cache-line size for the memory.

The TLB is initially searched for a translation for a specified input address. If exactly one valid entry of the TLB stores a translation for the specified input address then the output address corresponding to the specified input address is determined from the contents of that entry. If two or more valid entries of the TLB store a translation for the specified input address then these entries are invalidated. The translation table is searched for a translation for the specified input address if more than one, or none, of the valid entries of the TLB store a translation for the specified input address.

If a search of the translation table is required then the method involves the retrieval from the translation table, and insertion into the TLB, of a translation for the specified input address and possibly one or more translations for other input addresses that are stored together with the translation for the specified input address in one node of the B-tree implementing the translation table. In one embodiment the B-tree implementing the translation table consists of index nodes which store keys (against which the specified input address is specified) and pointers to other nodes in the translation tree and leaf nodes which store translations for one or more input addresses.

During the insertion into the TLB of a translation for a particular input address that was retrieved from the translation table it is determined if there is exactly one valid entry in the TLB that stores a translation for the particular input address. If so, then the translation retrieved from the translation table is inserted into that entry, thereby avoiding the creation of multiple TLB entries for the same input address. Otherwise, the translation retrieved from the translation table is inserted into an entry of the TLB determined by the TLB replacement policy, which in one embodiment is FIFO (first-in first-out).

In one embodiment, control signals whose assertion results in a search of the TLB and a writing into the TLB, respectively, are asserted in the same cycle. Thus, the insertion into the TLB of a translation for a particular address retrieved from the translation table is not delayed by the search of the TLB for a translation for the particular address performed to avoid the creation of duplicate TLB entries.

Advantageously, the present data structure stores translations for similar input addresses in adjacent locations in the memory so that the table walker retrieves and inserts into the TLB not only the translation for the specified input address but also one or more translations for input addresses similar to the specified input address. In this way the time needed to perform the table search is amortized over several translations. Given the locality of reference that most applications programs exhibit, it is likely that translations will be needed in the near future for addresses similar to the specified input address whose translation is currently requested.

However, it is possible that translations for addresses similar to the specified input address that are retrieved together with the translation for the specified address may already be present in the TLB. The present methods avoid creating a duplicate entry in the TLB for any translation that is retrieved from memory by the table walker.

DETAILED DESCRIPTION OF THE PREFERRED EMBODIMENTS

Overview of the translation process

Figure 1A:
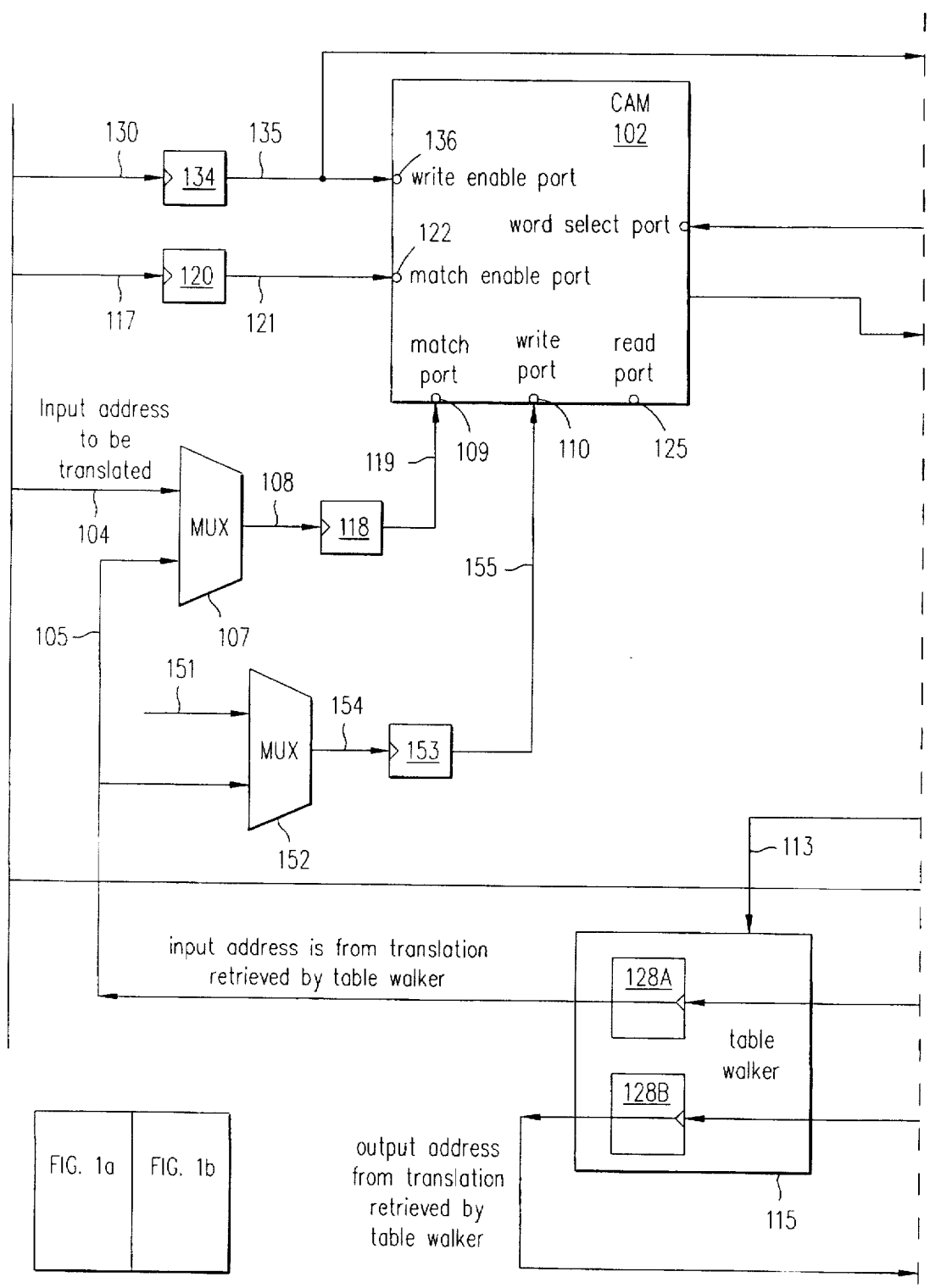
FIG. 1 illustrates a translation lookaside buffer and a table walker in accordance with this invention.
Figure 1B:
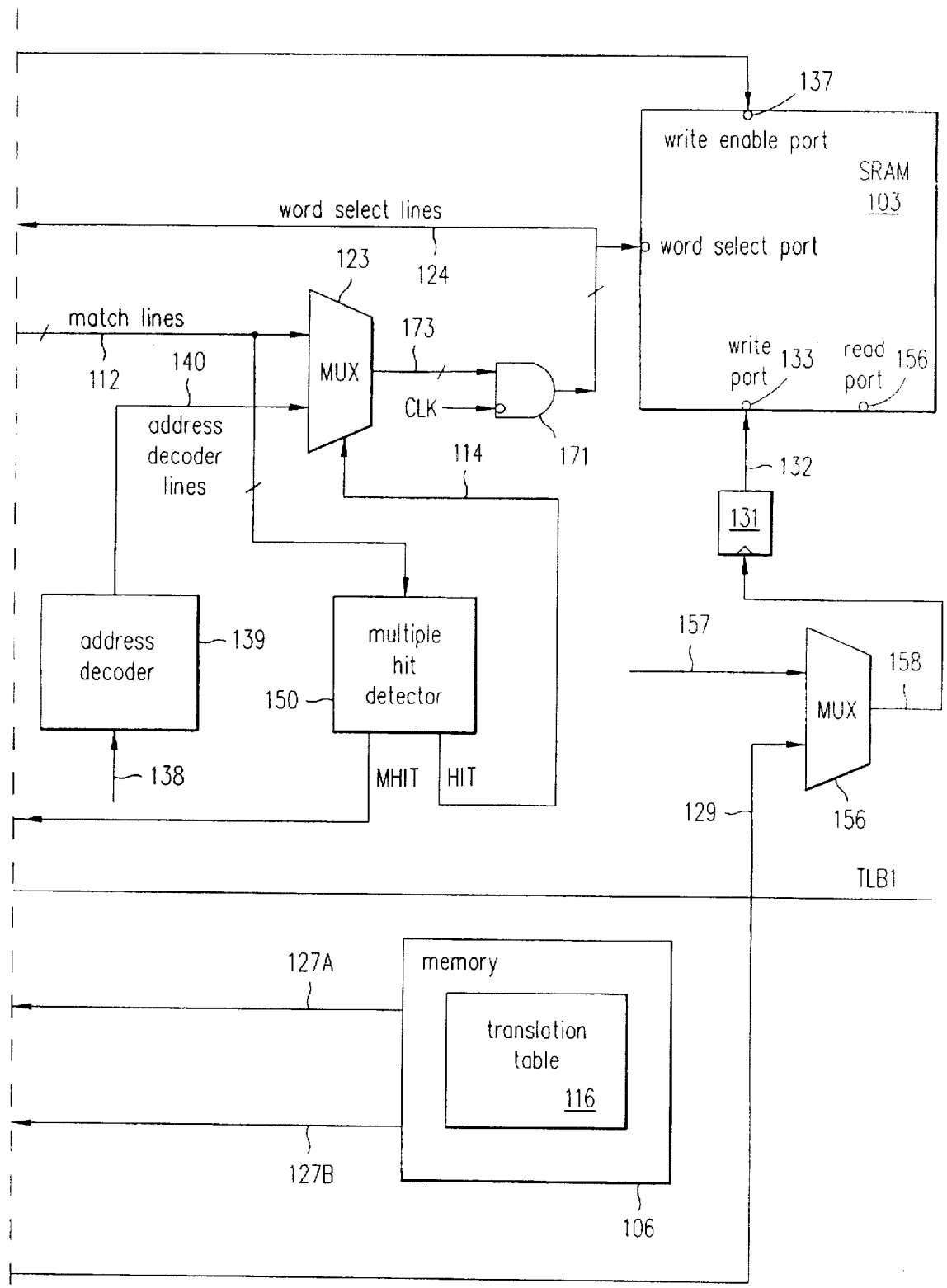

One embodiment of a TLB in accordance with the present invention is depicted in FIG. 1. TLB 101 includes a content addressable memory (CAM) 102 and Static Random Accessible Memory (SRAM) 103. CAM 102 and SRAM 103 each contain 128 addressable elements (hereinafter referred to as "entries"). Each entry of CAM 102 contains a valid bit field. If the valid bit for a particular entry of CAM 102 is asserted then the entry, together with its corresponding entry in SRAM 103, represents a valid translation. Otherwise, the particular entry is to be ignored. Each entry of CAM 102 also contains an input address field, whose translated address is stored in the corresponding entry of SRAM 103. (In some embodiments, data used to compute the translated address, rather than the translated address itself, is stored in SRAM 103.)

A signal on line 104, indicating an input address (X) whose translation is desired (hereinafter the "specified address"), is received by TLB 101. The contents of each entry of CAM 102 are compared with the specified input address. This task, which is referred to as a MATCH operation, is described below in further detail.

If exactly one valid entry of CAM 102 stores the specified input address then the output address representing the translation of the specified input address is determined from the contents of the corresponding entry of SRAM 103. If two or more valid entries of CAM 102 store the specified input address then these entries are invalidated via an INVALIDATE operation, which is described in more detail below.

A translation table 116 (which in one embodiment is implemented by a B-tree data structure) stored in memory 106 is searched by table walker 115 for a translation for the specified input address if more than one, or none, of the valid entries of CAM 102 store the specified input address. Table walker 115, as discussed below in more detail, may retrieve from translation table 116 not only a translation for the specified input address but possibly one or more translations for other input addresses.

Each translation retrieved by table walker 115 is inserted into an entry of CAM 102 and corresponding entry of SRAM 103 via an INSERTION operation, which is described in more detail below. In order to avoid creating a duplicate translation when inserting into TLB 101 a translation for a particular input address retrieved from translation table 116, a MATCH operation is performed in order to determine if a translation for that particular address is already stored in an entry of TLB 101. If exactly one entry of TLB 101 stores a translation for that particular address then the translation for that particular address that was retrieved by table walker 115 from translation table 116 is inserted into that exactly one entry, thereby avoiding the creation of multiple TLB entries for the particular address. Otherwise, the TLB entry into which the translation retrieved by table walker 115 is inserted is determined by the replacement policy for TLB 101.

Operations supported by CAM 102

The TLB 101 supports several operations including MATCH, WRITE, INSERTION and INVALIDATE. Each of these four operations is described below.

TLB MATCH operation

A MATCH operation is performed in two situations. In the first situation, a MATCH operation is performed when TLB 101 receives on line 104 a signal indicating an input address whose translation is desired. In this situation MUX 107 selects the signal on line 104. If the MATCH operation in this first situation finds exactly one valid matching entry of CAM 102 then the desired ouput address is retrieved from the corresponding entry of SRAM 103. Otherwise, table walker 115 must search translation table 116, which is stored in memory 106, for a translation for the input address indicated by the signal on line 104.

In the second situation, a MATCH operation is performed when TLB 101 receives on line 105 a signal indicating an input address whose translation has been retrieved from translation table 116 by table walker 115. In this situation MUX 107 selects the signal on line 105.

When the signal on line 121 received by CAM match enable port 122 is asserted then a MATCH operation occurs during which the input address field of every entry of CAM 102 is simultaneously compared with the input address (hereinafter "X") indicated by the signal on line 119 that is received by CAM match port 109.

Match lines 112, MATCH|127:0| (one for each entry of CAM 102), are coupled to CAM 102 and a multiple hit detector (MHD) 150. If the input address field of ith entry of CAM 102, CAM(i), is equal to ("matches") X, and the valid bit of CAM(i) is asserted then the signal on the ith match line, MATCH(i), is asserted. In some embodiments, a process ID, corresponding to the process that generated the virtual address currently being translated by the MMU, is also supplied to CAM 102 and must be matched, in addition to the input address, to a corresponding field in an entry of CAM 102. Such embodiments may be used where the translation step corresponding to CAM 102 is process id-dependent, in order to avoid having to invalidate the entire contents of CAM 102 upon a context switch, i.e. when a different process begins to execute.

MHD 150 determines whether zero, one or more of the signals on match lines 112 are asserted and sets two signals, MHIT and HIT, which are transmitted on lines 113 and 114, respectively. If the signal on exactly one of match lines 112 is asserted then MHD 150 asserts the HIT signal. MHD 150 asserts the MHIT signal if the signals on more than one, or none, of match lines 112 are asserted.

Figure 9:
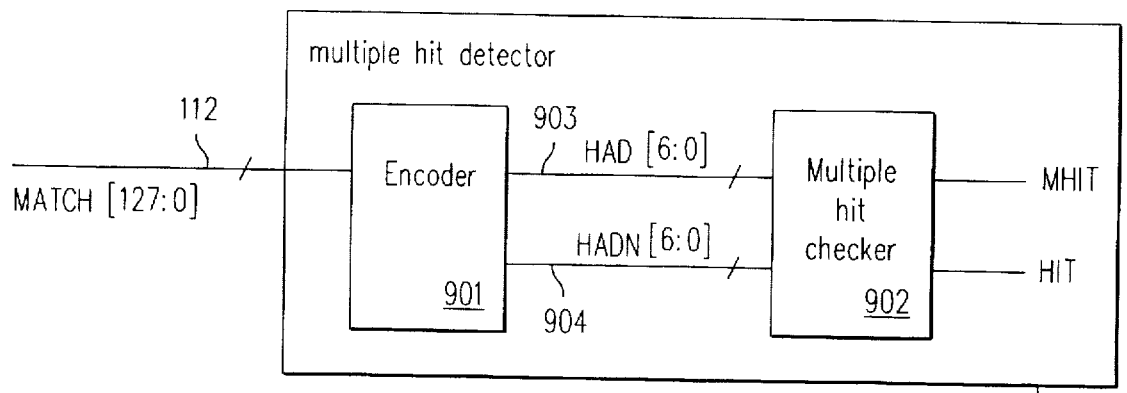
FIG. 9 depicts a block diagram of a multiple hit detector in one embodiment, consisting of an encoder and a multiple hit detector.
Figure 11:
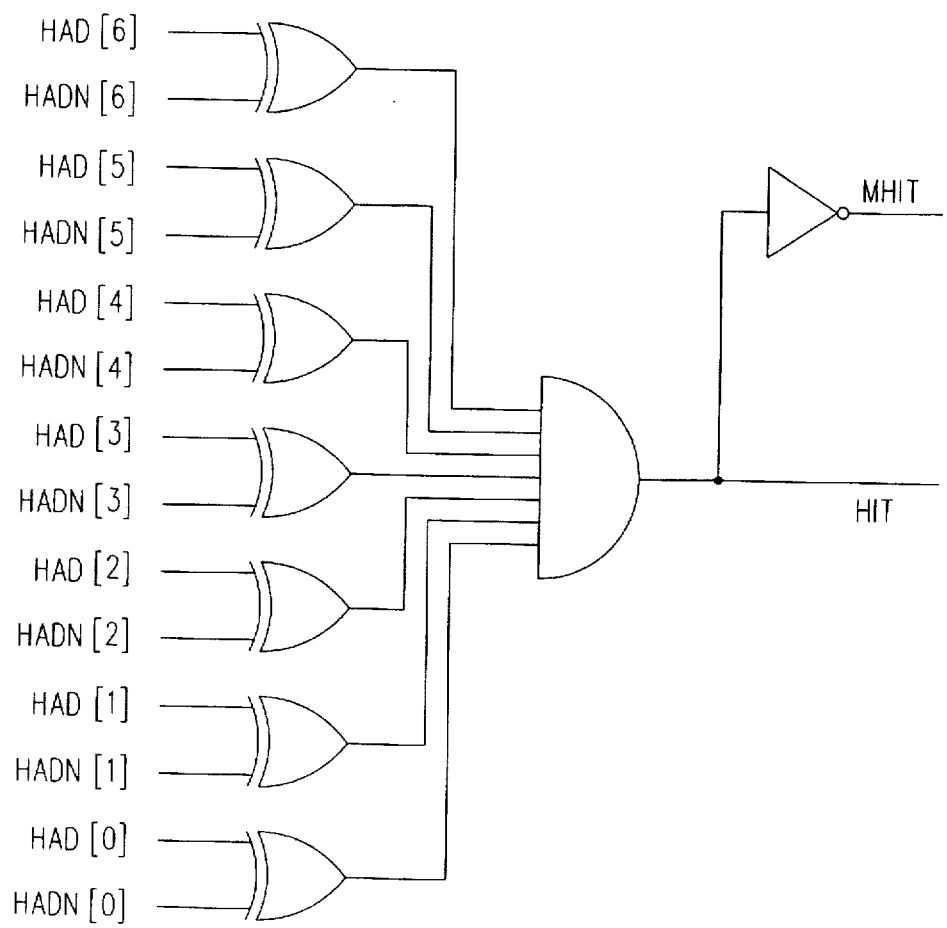
FIG. 11 depicts a multiple hit checker contained in a multiple hit detector in one embodiment.

In one embodiment, MHD 150 has the structure depicted in FIG. 9. Encoder 901 encodes the 128 binary signals carried on match lines 112 into two 7-bit signals HAD|6:0| and HADN|6:0| carried on lines 903 and 904, respectively. Multiple hit checker 902 asserts the HIT signal if HAD and HADN are bit-wise complements of each other. Otherwise, multiple hit checker asserts the MHIT signal. In one embodiment encoder 901 and multiple hit checker 902 are the circuits depicted in FIGS. 10 and 11 respectively.

Figure 10A:
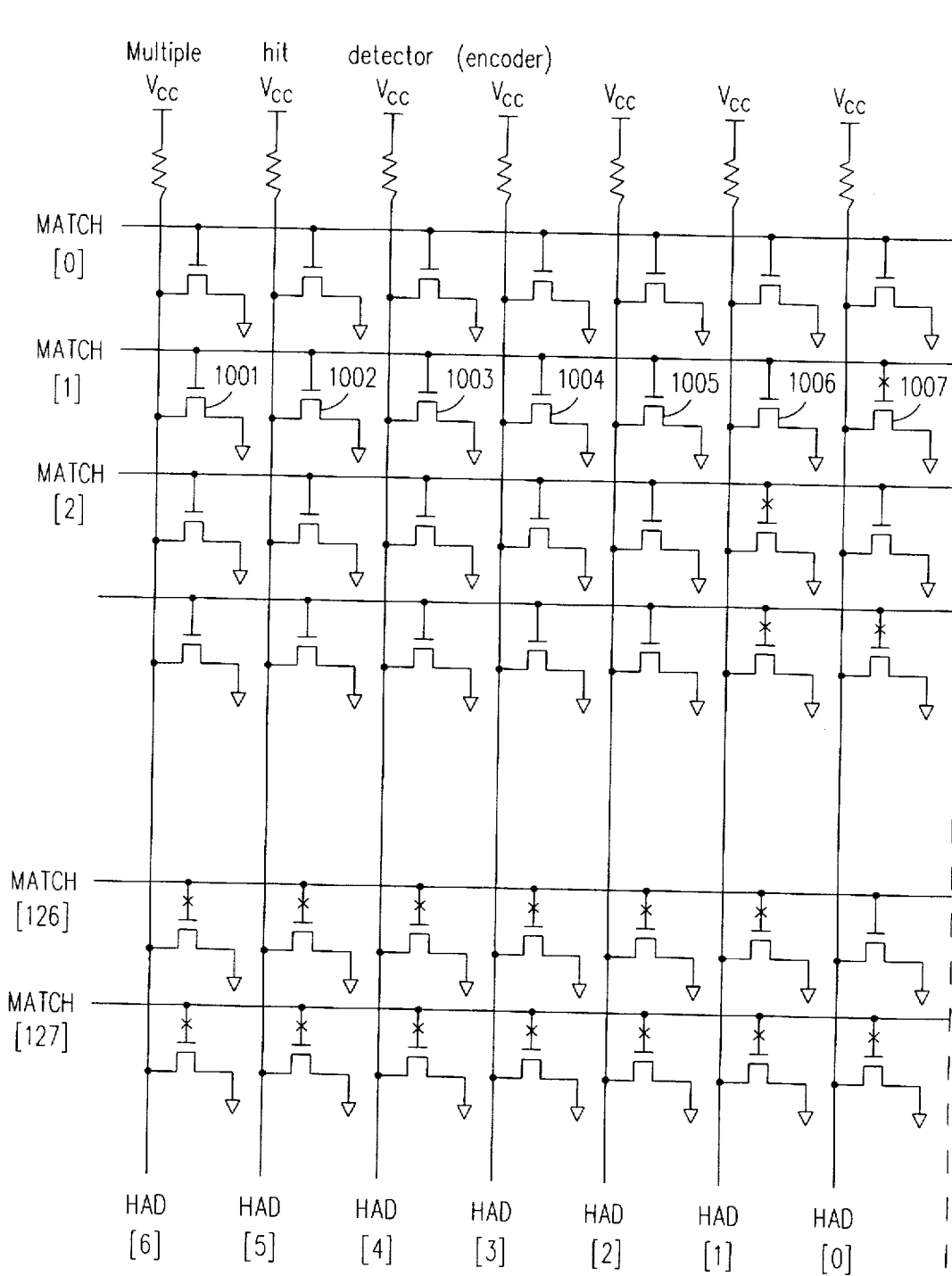
FIG. 10 depicts an encoder contained in a multiple hit detector in one embodiment.
Figure 10B:
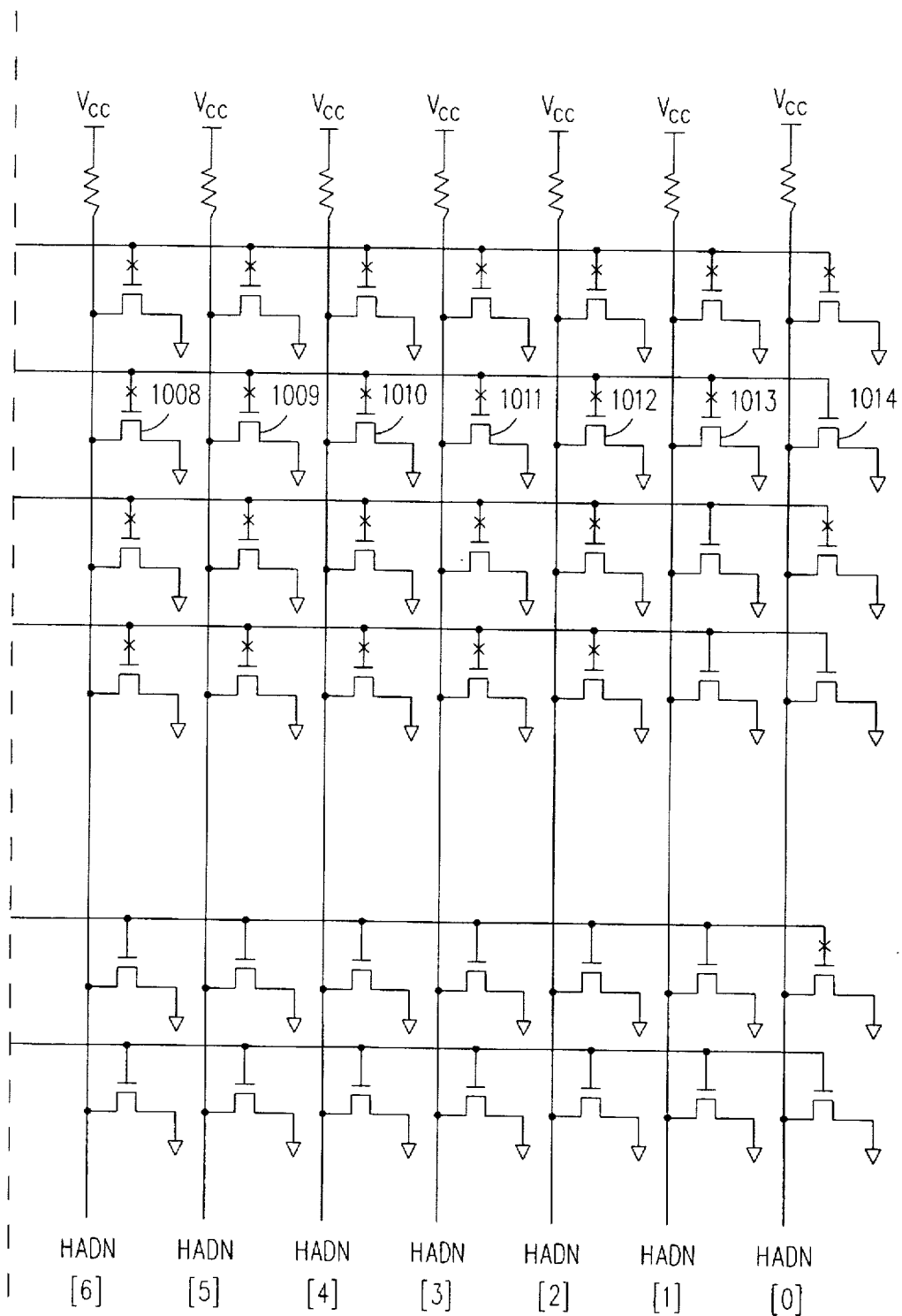

In FIG. 10, each of the signals on match lines 112, i.e. MATCH[127:0], is associated with two respective sets of 7 MOSFET transistors. The locations of zeros in the 7-bit binary representation for i, where i is between 0 and 127 inclusively, determines the members of the first set of 7 MOSFETs associated with MATCH[i] whose gates are connected to MATCH[i]. For example, if i=1 the binary representation for i is 0000001. Thus, MATCH[i] is connected to the gates of MOSFETs 1001, 1002, 1003, 1004, 1005, 1006 but not 1007.

The locations of ones in the 7-bit binary representation for i, where i is between 0 and 127 inclusively, determines the members of the first set of 7 MOSFETs associated with MATCH[i] whose gates are connected to MATCH[i]. For example, if i=1 the binary representation for i is 0000001. Thus, MATCH[i] is connected to the gate of MOSFET 10014 but not to the gates of MOSFETs 1008, 1009, 1010, 1011, 1012, 1013 but not 1014.

A table walker 115 (see FIG. 1) receives the MHIT and HIT signals on lines 113 and 114, respectively. In the case of no or multiple matching entries in CAM 102 upon a MATCH operation for an input address received on line 104, table walker 115, upon detecting the assertion of the MHIT signal on line 113, searches translation table 116 (held in memory 106) for a translation for input address X. This search by table walker 115 is described in greater detail below. On the other hand, if exactly one of match lines 112, MATCH(i), is asserted as a result of the MATCH operation then the above-mentioned table walker search is not initiated and the output address representing the translation of input address X is retrieved from the ith entry of SRAM 103, SRAM(i).

The timing of a MATCH operation is as follows. In the first cycle, the signal on line 108 indicates an input address X to be matched. Also, in the first cycle, the match enable signal on line 117 is asserted. In the second cycle, the signal on line 108 is latched by latch 118 and thus the signal on line 119, which is received at CAM match port 109, indicates input address X. Also, in the second cycle, the match enable signal on line 117 is latched by latch 120 and thus the signal on line 121, which is received by CAM match enable port 122, is asserted.

The assertion of the signals transmitted on zero, one or more match lines 112 (corresponding to matching entries of CAM 102) and the setting by MHD 150 of signals MHIT and HIT, transmitted on lines 113 and 114, respectively, are achieved within the first half of the second cycle of the MATCH operation.

If the signal on exactly one of match lines 112, MATCH (i), is asserted during the first half of the second cycle of a MATCH operation then the signals on match lines 112 are selected by MUX 123 due to the assertion of the HIT signal. Exactly one of 128 output lines 173 of MUX 123 is asserted by the end of the first half of the second cycle. Each output line 173 is connected to an input line of a respective one of 128 AND gates 171. TLB word select lines 124 are the respective ouput lines of AND gates 171. The clock signal is provided to an inverted input of each of 128 AND gates 171. Thus, during the second half of the second cycle, exactly one of signals transmitted on TLB word select lines 124, WL(i), is asserted.

If the MATCH operation was performed for an input address supplied on line 104 then the contents of CAM(i) and SRAM(i) are made available at CAM read port 125 and SRAM read port 126, respectively. The contents of SRAM (i) contain the desired output address corresponding to the input address X. In some embodiments, a field in SRAM(i) may be used to perform a parity check on the contents of CAM(i). If, on the other hand, the MATCH operation was performed for an input address supplied on line 105 then the data indicated by signals 155 and 132 (i.e. a translation retrieved from translation table 116 by table walker 115) are written into CAM(i) and SRAM(i), respectively.

TLB INVALIDATE OPERATION

Figure 2:
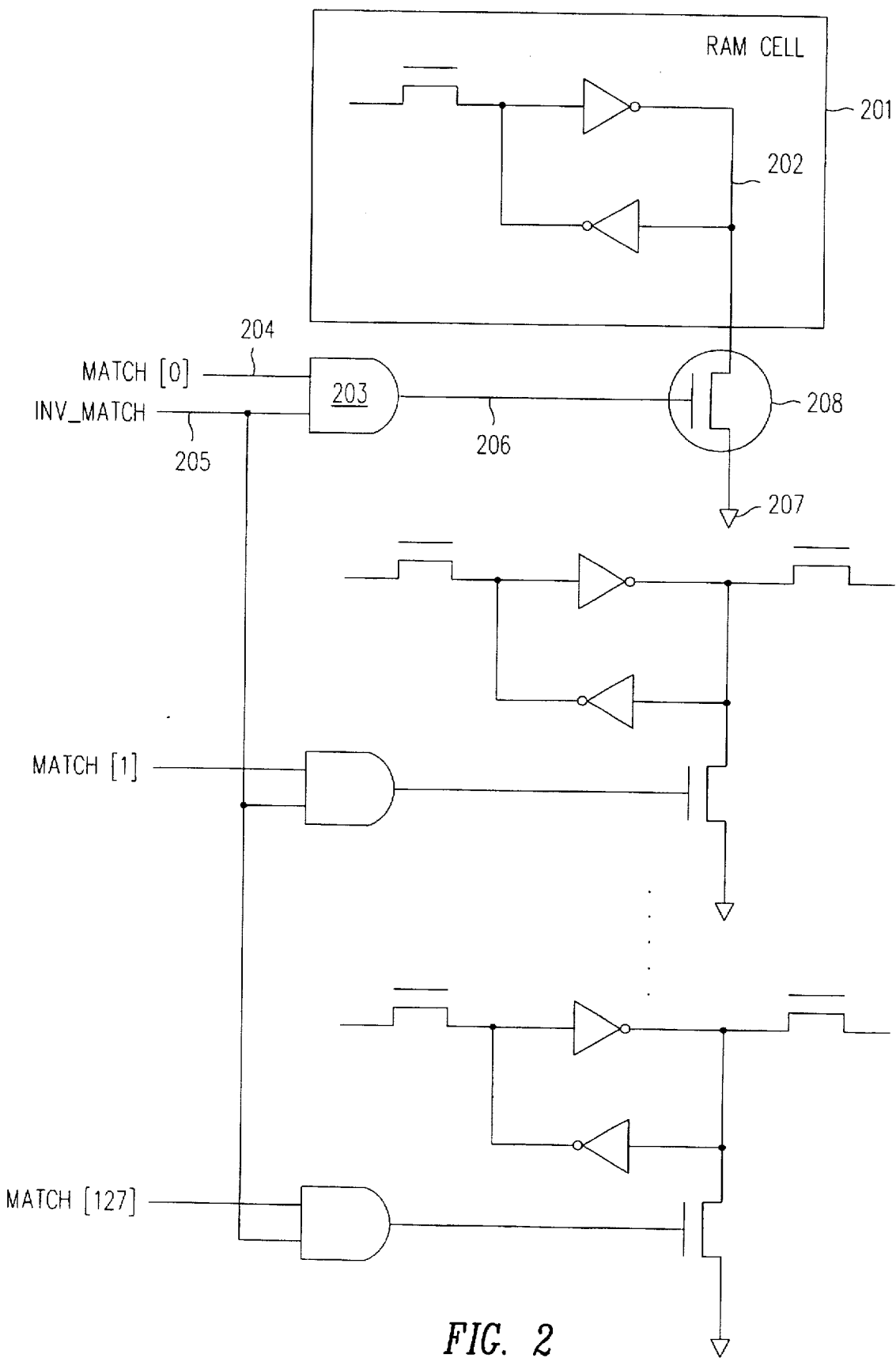
FIG. 2 illustrates the circuitry in one embodiment used to invalidate the valid bits of CAM entries.

In the case of multiple matching entries in CAM 102 upon a MATCH operation for an input address received on line 104, logic in TLB 101 deasserts the valid bits of the matching entries. In one embodiment, the logic circuitry deasserting valid bits upon the detection of multiple matching entries is as shown in FIG. 2. The valid bit of each entry of CAM 102 is implemented by a standard 6-transistor RAM cell. For example, the value of the valid bit for CAM(0) is stored in RAM cell 201 as the signal on line 202.

The deassertion of the valid bit for CAM(0) upon the occurrence of multiple matching entries (including CAM (0)) is achieved as follows. Upon the occurrence of multiple matching entries, more than one of the signals on match lines 112, including MATCH[0] carried on input line 204 of AND gate 203, are asserted. In response, MHD 150 asserts the MHIT signal on line 113. As a result of the assertion of the MHIT signal, the signal INV_MATCH on input line 205 of AND gate 203 is asserted. Thus, the signal of an output line 206 of AND gate 203 becomes asserted. The output line 206 is coupled to the gate of a MOSFET 208. The source of MOSFET 208 is connected to line 202 and the drain of MOSFET 208 is connected to a ground source 207. The assertion of the signal on line 206 turns MOSFET 208 on and thus the signal on line 202 is tied to ground, thereby deasserting the valid bit for CAM(0). The deassertion of the valid bits of other entries of CAM is similarly achieved.

TLB WRITE Operation

In a WRITE operation, the data indicated by the signals on lines 155 and 132 is written into an entry of CAM 102 and corresponding entry of SRAM 103, respectively. The WRITE operation is performed in two situations.

In the first situation, the WRITE operation is specified by an instruction executed by the CPU. In this situation, the CPU supplies a signal on line 138 indicating the element of CAM 102 and SRAM 103 into which the write is to occur, a signal on line 151 indicating the data to be written into CAM 102 and a signal on line 157 indicating data to be written into SRAM 103. MUXes 123, 152 and 156 select the signals on lines 140, 151 and 157, respectively.

In the second situation, the data to be written into CAM 102 and SRAM 103 is retrieved from translation table 116 and supplied by table walker 115 on lines 105 and 129, respectively. A signal on line 138 indicates the element of CAM 102 and SRAM 103 into which the write is to occur and is set according to the TLB replacement policy. MUXes 123, 152 and 156 select the signals on lines 140, 105 and 129, respectively.

The timing of a WRITE operation is as follows. In the first cycle, a write enable signal on line 130 is asserted. In the second cycle, the write enable signal on line 130 is latched by latch 134 and is thus received by CAM write enable port 136 and SRAM write enable port 137. Also, during the second cycle the outputs of MUXes 152 and 156 are latched by latches 153 and 131, respectively and are thus received by CAM write port 110 and SRAM write port 133, respectively. During the first half of the second cycle, the address indicated by the signal on line 138 is decoded by address decoder 139. By the beginning of the second half of the second cycle one of address decoder lines 140 is asserted and the corresponding output line of MUX 123 is asserted. During the second half of the second cycle the corresponding word select line 124 is asserted (this assertion is triggered by the falling edge of the clock signal which is connected to an inverted input of each of the 128 AND gates 171) and the data at CAM write port 110 and SRAM write port 133 is written into the entry of CAM 102 and corresponding entry of SRAM 103, respectively, corresponding to the asserted word select line 124.

TLB INSERTION Operation

As discussed above, if a unique valid translation for input address X, indicated by the signal on line 104, is not present in TLB 101, then table walker 115 searches for the desired translation in translation table 116, a data structure held in memory 106. As described in more detail below, table walker 115 might retrieve several unrequested translations as a result of this search. Each of the translations retrieved from memory 106 by table walker 115 is entered into TLB 101 via an INSERTION operation. There is a possibility that a retrieved but unrequested translation will already exist in TLB 101. The INSERTION operation is designed to avoid creating multiple entries for the same input address, without incurring an increase in the time required to insert those retrieved translations that are not already present in TLB 101.

Figure 3:
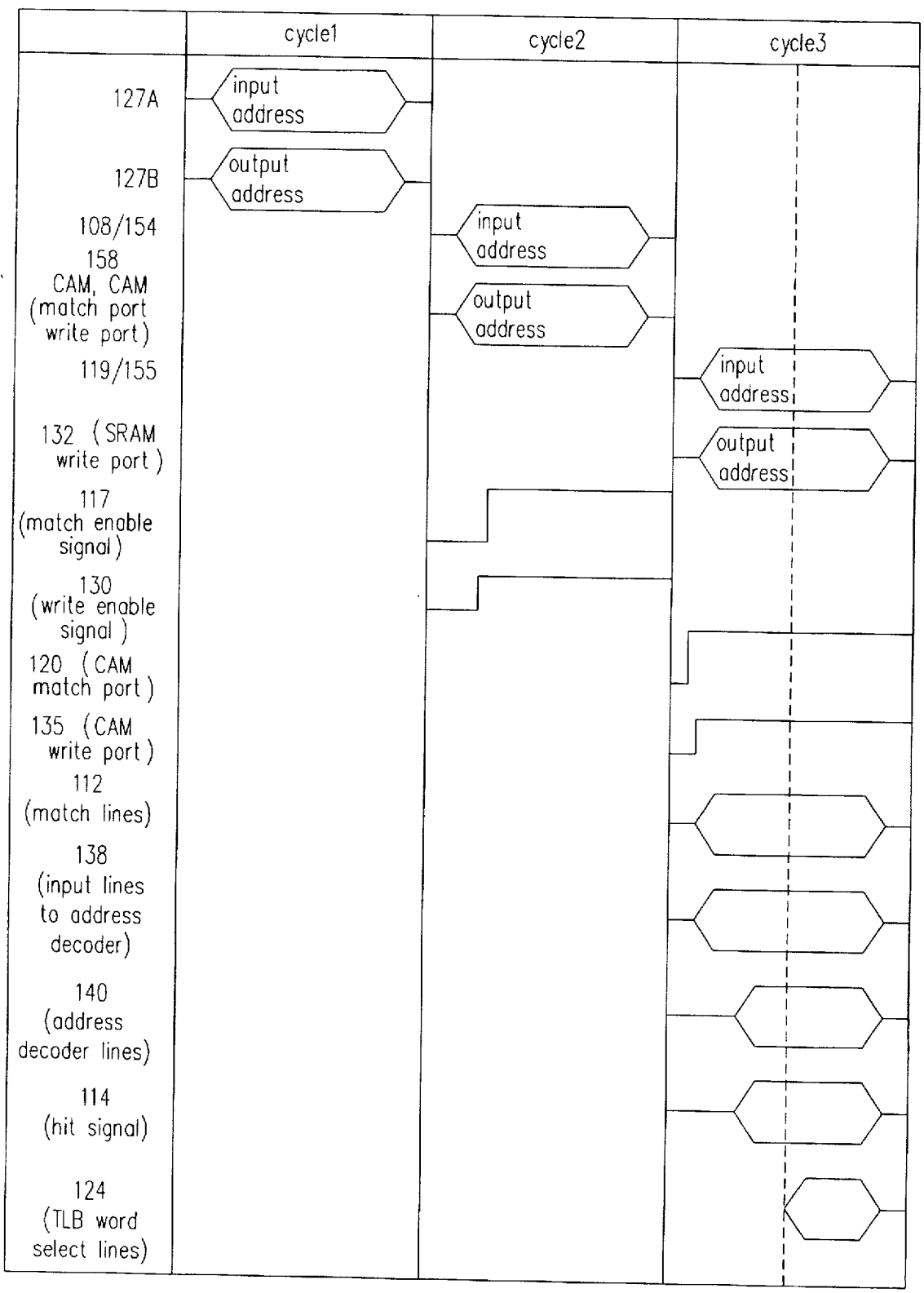
FIG. 3 depicts the timing for an INSERTION operation performed by the TLB in one embodiment.

The timing of an INSERTION operation in one embodiment is as illustrated in FIG. 3. In the first cycle, memory 106 generates signals on lines 127A and 127B which indicate an input address Y to be inserted into an entry of CAM 102 and a corresponding output address (or, in some embodiments, output data from which an output address is computed) to be inserted into a corresponding entry of SRAM 103, respectively. Together, the signals on lines 127A and 127B constitute a translation to be inserted into TLB 101. (In the embodiment defined by the RTL code attached in Appendix A, the memory can only transfer eight bytes per cycle and thus the signal representing CAM portion of the translation (8 bytes) is transferred in one cycle and the signal representing the SRAM portion of the translation is transferred over the following two cycles.)

In the second cycle, buffers 128A and 128B contained in table walker 115 latch the signals on lines 127A and 127B, respectively, thereby generating two signals on lines 105 and 129. When TLB 101 performs an INSERTION operation, MUXes 107 and 152 select the signal on line 105, and as a result the signals on lines 108 and 154 also indicate input address Y during the second cycle. When TLB 101 performs an INSERTION operation, MUX 156 selects the signal on line 129, and as a result the signal on line 158 also indicates an output address corresponding to input address Y during the second cycle.

Also in the second cycle, the match enable and write enable signals on lines 117 and 130, respectively, are asserted. Thus, an INSERTION operation is a combination of a MATCH operation and a WRITE operation. As will be discussed below in more detail, the initiation of the MATCH and WRITE operations in the same cycle (as opposed to performing the MATCH operation first and then deciding whether or not to do a WRITE operation on the basis of the results of the MATCH operation) by the assertion of the match enable and write enable signals on lines 117 and 130, respectively, avoids an increase in the time required to perform an INSERTION operation.

In the third cycle, latches 118 and 153 latch the signals on lines 108 and 154, respectively, and thus the signals on lines 119 and 155, received by CAM write port 110 and CAM match port 109, respectively, indicate input address Y. Also, in the third cycle, latch 131 latches the signal on line 158 and thus the signal on line 132, received by SRAM write port 133, indicates an output address corresponding to input address Y. In the first half of the third cycle, the match enable signal on line 117 is latched by latch 120 and thus, the signal on line 121, which is received by CAM match enable port 122, is asserted. As a result of the assertion of the signal on line 121 the following occur during the first half of the third cycle, as per an ordinary MATCH operation: 1) input address, Y, is matched against the input address fields of every entry of CAM 102; 2) zero, one or more of the signals transmitted on match lines 112 are asserted; 3) multiple hit detector 150 determines if the input address Y has matched zero, one or multiple valid entries in CAM 102 and 4) MHD 150 sets the MHIT and HIT signals on lines 113 and 114, respectively.

The address signals on lines 138 are decoded by address decoder 139 in the first half cycle of the third cycle and indicate which entry of TLB 101 will be used to insert the translation from memory unless there is already exactly one entry in CAM 102 matching input address Y. The replacement policy for TLB 101 determines the way in which the address signals on lines 138 are set during an INSERTION operation. In one embodiment, wherein FIFO (first-in, first-out) replacement is employed, the address signals on lines 138 are initially set to point to CAM(0). After each INSERTION operation, address signal on lines 138 are changed to point to CAM ((i+1) mod 128) when they currently point to CAM(i), unless exactly one CAM entry matches the input address to be inserted into CAM 102 in which case the address signals on lines 138 are not changed.

If MHD 150 determines that input address Y matches multiple or no entries of CAM 102 and therefore MHD 150 deasserts the HIT signal on line 114 (which drives the select line of MUX 123) in the first half of the third cycle, then the signals on address decoder lines 140 are selected by MUX 123 and the CAM word select line 124 corresponding to the asserted address decoder line 140 is asserted in the second half cycle of the third cycle (this assertion is triggered by the falling edge of the clock signal which is connected to an inverted input of each of the 128 AND gates 171).

Otherwise, i.e. in the case of a single entry of CAM 102 matching input address Y, MHD 150 deasserts the HIT signal on line 114 in the first half of the third cycle and as a result match lines 112 are selected by MUX 123. During the second half of the third cycle, the word select line 124 corresponding to the asserted match line 112 is asserted (this assertion is triggered by the falling edge of the clock signal which is connected to an inverted input of each of the 128 AND gates 171).

Also, in the third cycle, the write enable signal on line 130 is latched by latch 134 and thus, the signal on line 135, which is received by CAM write enable port 136 and SRAM write enable port 137, is asserted. Thus, during the third cycle the translation data indicated by the signals on lines 119 (i.e. input address) and 132 (output address) is written into the entry of CAM 102, and corresponding entry of SRAM 103, selected by TLB word select lines 124.

The above INSERTION operation avoids the creation of multiple matching entries in TLB 101 in the case of a single matching entry already present in TLB 101 by driving TLB word select lines 124 with match lines 112, thereby overriding the matching entry with the translation fetched from memory 106 by table walker 115 as opposed to entering the fetched translation into another TLB entry, i.e. the one indicated by the address signals on lines 138. On the other hand, the matching that is performed during an INSERTION to prevent the creation of multiple matching entries does not increase the time required to insert the translation data fetched from memory 106 into the TLB entry indicated by the address signals on lines 138 in the case of no or multiple matching CAM entries.

This is because write and match operations are started simultaneously by the assertion of the match enable and the write enable signal on lines 117 and 130, respectively, in the same cycle and because the decoding of the address signals on lines 138, indicating the entry of TLB 101 into which the translation to be inserted will be placed if there is not exactly one matching entry in TBL 101, occurs simultaneously (during the first half of the third cycle) with the matching of the input address associated with the translation against the entries of CAM 102.

If memory 106 can supply table walker 115 with one translation per cycle, then the above-described INSERTION operation can support an effective insertion rate of approximately one translation per cycle, since the translations can be pipelined along lines 127A, 105/154 and 155 (for writing into CAM 102), along lines 127A, 105/108 and 119 (for matching with CAM 102) and along lines 127B, 129/158 and 132 (for insertion into SRAM 103). In addition, buffers 128A and 128B in table walker 115 only need to be large enough to hold one translation, since table walker 115 can send out translations on lines 105 and 129 as fast as table walker 115 receives translations from memory 106.

As discussed above, the actual matching and writing in an INSERTION operation for TLB 101 occur in the same cycle. On the other hand, a TLB that performs insertions by first matching and then writing in a subsequent cycle (depending on the results of the matching) could not support an effective rate of insertion exceeding one translation per two cycles, assuming the TLB is incapable of matching a second input address while writing a first input address that was matched in the previous cycle. Also, buffer space sufficient to store N/2 translations would be required in such a TLB, where N is the maximum number of translations delivered by memory during any search of the translation table, if translations are delivered from the memory to the table walker at the rate of one translation per cycle.

In addition, an INSERTION operation designed to perform a match before initiating the writing of the fetched translation suffers from another disadvantage. Since the maximum effective insertion rate would be one translation per two cycles, table walker 115 can only send out one translation on signal on lines 105 and 129 every two cycles. Thus, table walker requires a buffer that can store approximately N/2 translations, where N is the maximum number of translations delivered by memory 106 in consecutive cycles.

Fetching Translation Data upon a TLB Miss

When the translation for a particular input address, X, is not present in TLB 101, table walker 115 searches a data structure held in memory 106 (translation table 116), created and maintained by the operating system, that contains translations for the currently running process. In one embodiment translation table 116, hereinafter referred to as the "translation tree", is implemented as a B-tree. B-trees are well known data structures and are defined and described at pages 305–327 in "Design of Database Structures" by Teorey and Fry (1982, Prentice Hall Inc.), hereby incorporated by reference. As described therein, there are several variants of a B-tree. The term B-tree is used herein to denote any of these and perhaps other variations of the conventional B-tree. In the embodiment described immediately below, translation table 116 is implemented by the variant of the B-tree known as a B*-tree.

Figure 4:
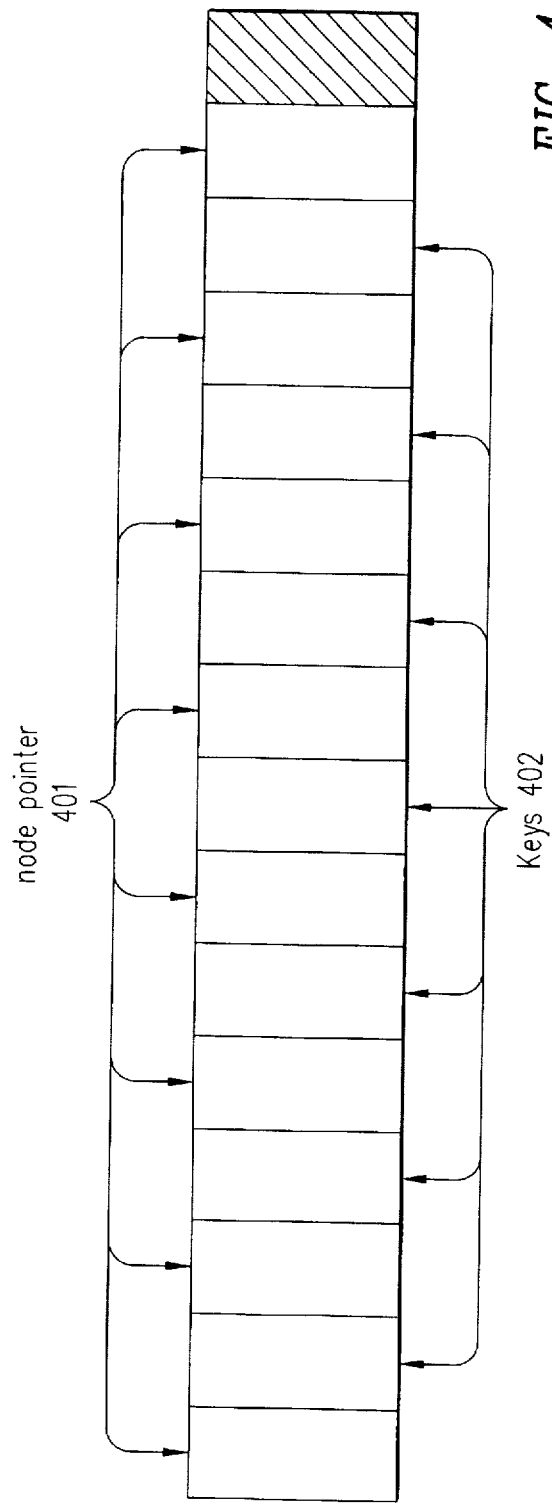
FIG. 4 depicts the structure of an index node of a B-tree implementing a translation table in one embodiment.

Each node of a B*-tree is either a leaf node or an index node. In one embodiment, each translation tree node is of size equal to the memory cache line size of 128 bytes and each index node of the translation tree is of the form depicted in FIG. 4. Index node 400 consists of alternating node pointers 401 and keys 402. Each of eight node pointers 401 and seven keys 402 is 8 bytes long. Each key 402 stores an input address which may be compared against X, the input address to be translated. Up to 6 of the last keys in any index node may be nil. The node pointer following a nil key is invalid. The values of the non-nil keys in an index node increase in value from left to right. The last 8 bytes of every index node are ignored.

Each node pointer 401 contains the following fields: a node address field, which points to another node of the translation tree; a node address type field which defines the type of address stored in the node address field (see description below of some possible types of node address); a node type field, which indicates the type of node (leaf or index) pointed to by the address in the address field, and a translation number field, which indicates the number of valid translations stored in the leaf node pointed to by the address in the node address field (only applicable where the node type field is 'leaf').

As mentioned above, the address stored in the node address field of a node pointer 401 can take several forms. In various embodiments, the following, as well as possibly other, node address types may be provided: 1) real: The node address represents a real or physical memory address which can be directly used to retrieve from memory the translation tree node pointed to.

2) logical: The node address represents a logical address of some sort which of course must itself be translated to a real address before the translation tree node pointed to can be retrieved from memory. In some embodiments, this translation is achieved quite speedily. For example, the node address could represent a page offset within the page in which node pointer 401 resides, in which case the corresponding real address is formed merely by concatenating the real page address in which node pointer 401 resides with the node address stored in node pointer 401. In another embodiment, there might be provided in the MMU a special translation look-aside buffer to translate a logical address stored in the node address field of node pointer 401 into a real address.

Figure 5:
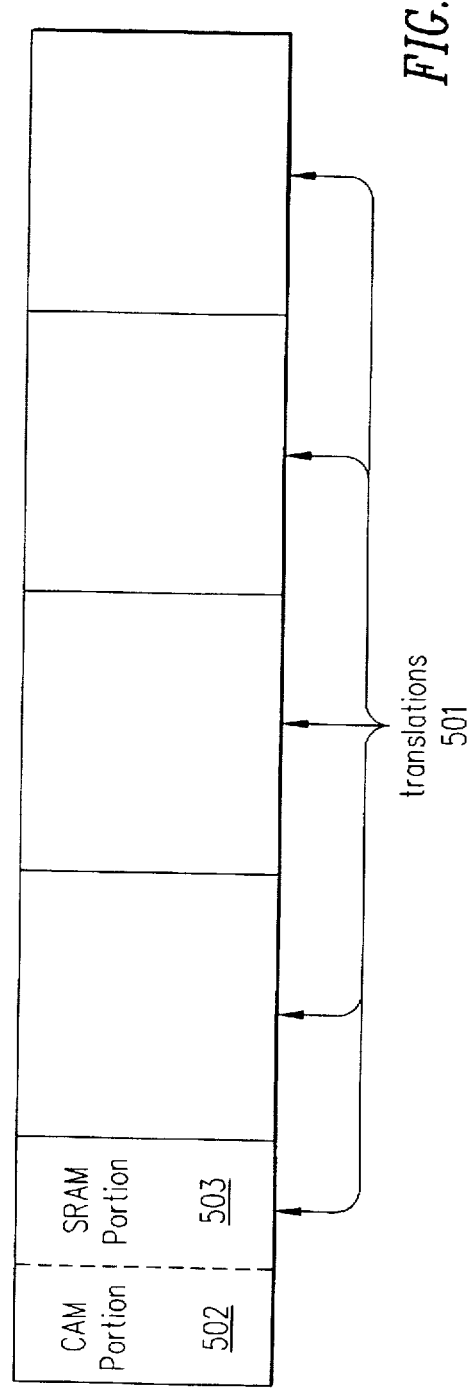
FIG. 5 depicts the structure of a leaf node of a B-tree implementing a translation table in one embodiment.

In one embodiment, a leaf node of the translation tree is of the form depicted in FIG. 5. Leaf node 500 occupies 128 bytes (the assumed cache line size of the memory in this embodiment) and stores 5 translation descriptors 501 (each occupying 24 bytes). The last 8 bytes of a leaf node are ignored. Each of translation descriptors 501 occupies 24 bytes and consists of a CAM data portion 502, occupying 8 bytes and an SRAM data portion 503, occupying 16 bytes. CAM data portion 502 and SRAM data portion 503 contain translation data to be inserted into an entry of CAM 102 (e.g. input address) and the corresponding entry of SRAM 103 (e.g. output address), respectively. In addition, CAM data portion 502 contains a valid bit which indicates whether or not its associated translation descriptor is valid.

A special register in the MMU is used to hold a node pointer, hereinafter referred to as the "TTRP" (translation tree root pointer), that has the same format as that of node pointers stored in index nodes of the translation tree, as described above, and whose node address field contains an address pointing to the root node of the translation tree for the currently executing process. Upon a context switch (i.e. when a different process starts executing), the operating system updates the contents of the TTRP register to point to the root node of the translation tree for the newly executing process.

Figure 6:
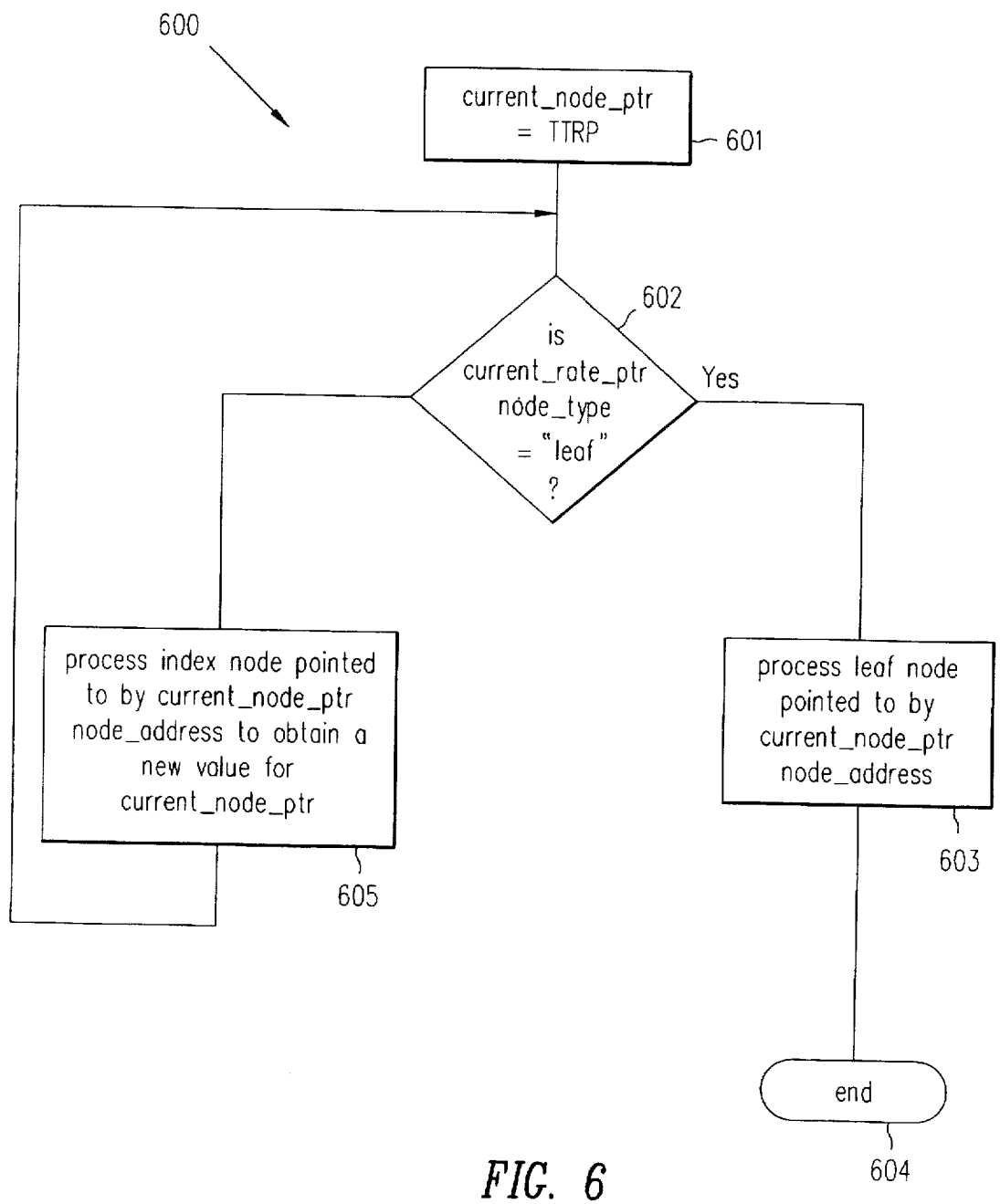
FIG. 6 depicts a flowchart illustrating the processing performed by a table walker while searching a translation table implemented as a B-tree, in one embodiment.

The steps involved in a search of the translation tree by table walker 116 are illustrated by flowchart 600 of FIG. 6. Processing by table walker 116 starts in step 601 where the variable current_node_pointer, stored in memory is initialized to the node pointer stored in the TTRP register. Throughout the processing depicted by FIG. 6, the node address field of current_node_pointer points to the currently searched translation tree node. Processing transfers from step 601 to decision step 602.

In decision step 602 table walker 115 examines the node type field of current_node_ptr. If the type field indicates "leaf" then processing transfers from step 602 to step 603. In step 603 table walker 115 processes the leaf node pointed to by the node address field of current_node_ptr. From step 603 processing transfers to step 604 where processing terminates.

If table walker 115 determines in step 602 that the node type field of current_node_ptr is "index" then processing transfers from step 602 to 605. In step 605 table walker 115 processes the index node pointed to by the node address field of current_node_ptr. By the end of step 605 current_node_ptr holds a pointer, stored in the translation tree node just searched and whose node address field points to the next translation tree node to be processed by table walker 115. From step 605 processing transfers to step 602.

Figure 7:
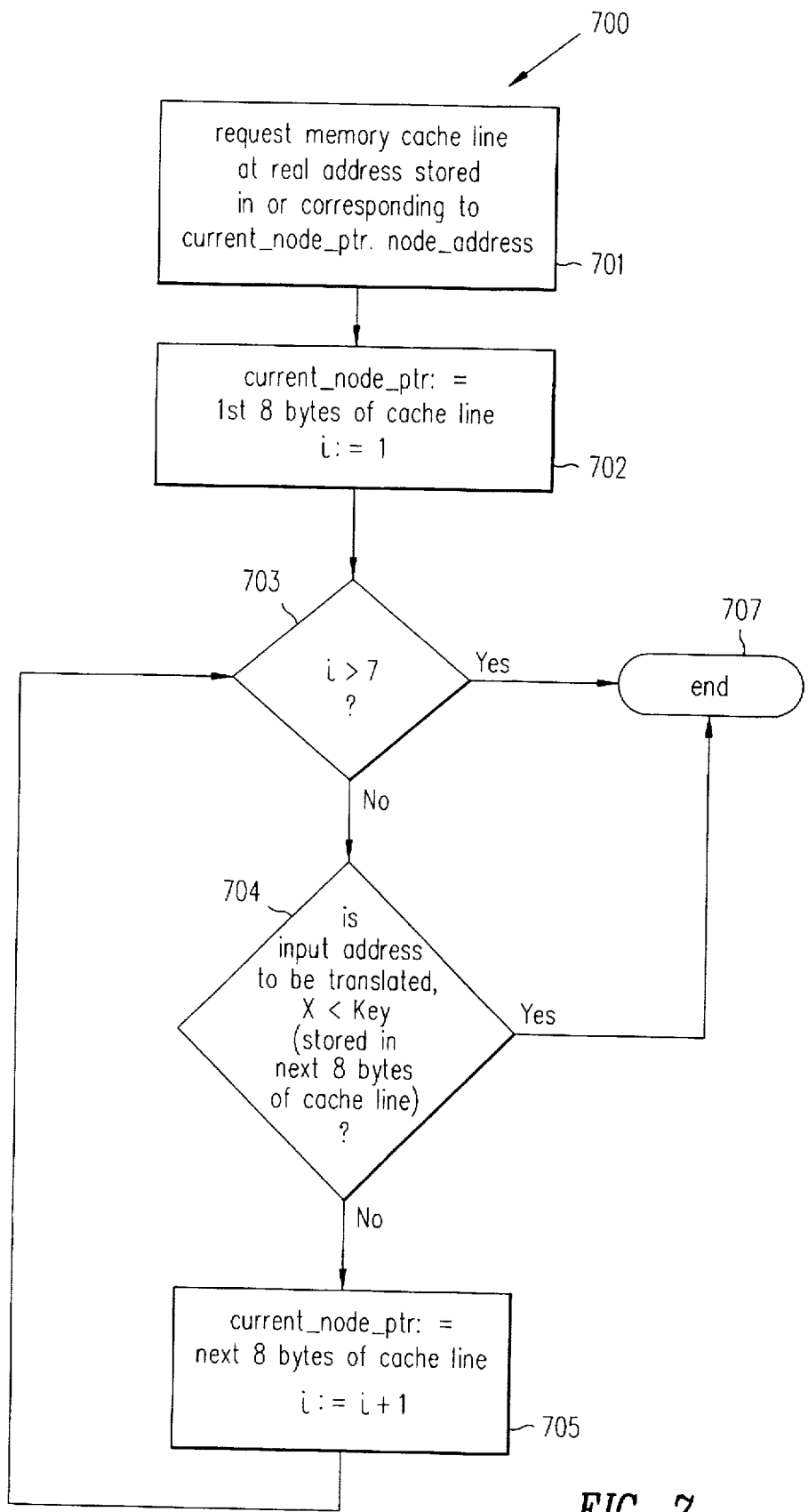
FIG. 7 depicts a flowchart illustrating the processing by a table walker of an index node of a translation table implemented as a B-tree, in one embodiment.

Step 605 of FIG. 6 for the processing of an index node of the translation tree by table walker 115 is illustrated in more detail by flowchart 700 of FIG. 7. Processing begins in step 701 in which table walker 115 requests the memory cache line starting at the real address stored in (or corresponding to, in the case of a logical node address) the node address field of the current_node_ptr. Memory 106 takes several cycles to set up the read and then sends in a sequence of consecutive cycles a fixed number (8, in the embodiment represented by the RTL code of Appendix A) of bytes of the requested cache line to table walker 115 until all 128 bytes of the cache line have been received. Processing transfers from step 701 to step 702, during which table walker 115 stores the first 8 bytes (a node pointer) returned from memory 106 into current_node_ptr. Also, during step 702, a counter variable, i, is initialized to 1. The purpose of counter variable i is to ensure that the loop defined by processing steps 703-705, described below, is not performed more than 7 times.

Processing transfers from step 702 to decision step 703 in which counter variable i is compared to 7. If i is greater than 7 then processing transfers to step 707 where processing terminates. If i is not greater than 7 then processing transfers to step 704 where table walker 115 compares the key contained in the next 8 bytes received from the memory with X, the input address whose translation is desired. If X is less than the key then processing transfers to step 707 where processing terminates. On the other hand, if X is not less than the key then processing transfers to step 705 where table walker 115 stores the next 8 bytes received from the memory (a node pointer) into current_node_ptr. Also in step 705, counter variable i is incremented by 1. From step 705 processing transfers to step 703.

Figure 8:
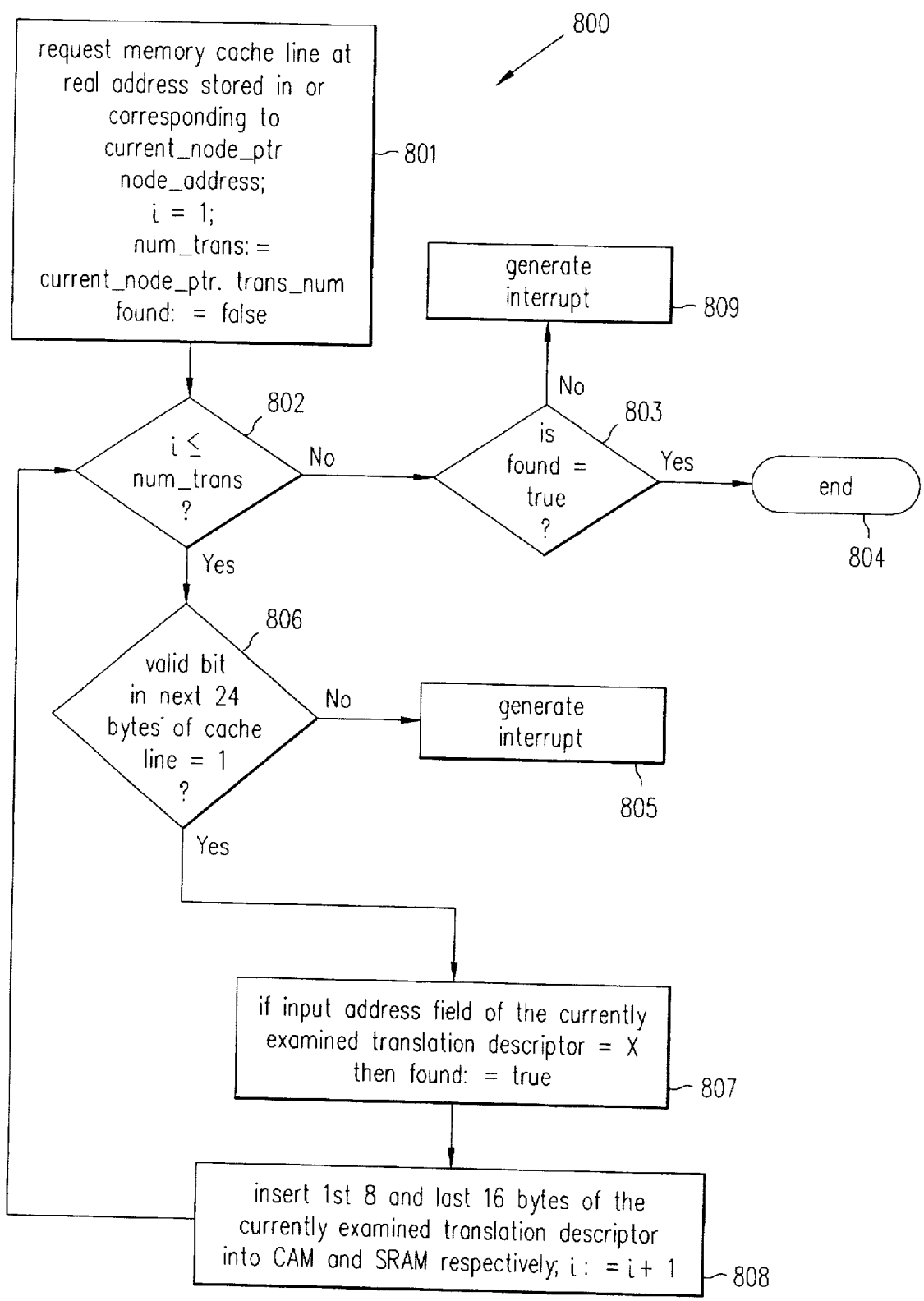
FIG. 8 depicts a flowchart illustrating the processing by a table walker of a leaf node of a translation table implemented as a B-tree, in one embodiment.

Step 603 of FIG. 6 for the processing of a leaf node of the translation tree by table walker 115 is illustrated in more detail by flowchart 800 of FIG. 8. Processing begins in step 801 in which table walker 115 requests the memory cache line starting at the real address stored in (or corresponding to, in the case of a logical node address) the node address field of the current_node_ptr. Memory 106 takes several cycles to set up the read and then sends in a sequence of consecutive cycles a fixed number (8, in the embodiment represented by the RTL code of Appendix A) of bytes of the requested cache line to table walker 115 until all 128 bytes of the cache line have been received.

As well, a counter variable, i, is set to 1 in step 801. The purpose of counter variable is to ensure that the loop defined by steps 802, 806, 807, and 808, described further below, is executed no more than 5 times. Also in step 801 the number of valid translations present in the currently processed leaf node, as stored in the translation number address field of current_node_$_{ptr}$, is stored in variable "num_trans". As well, a boolean variable "found", used to indicate whether or not the desired translation has been located, is initialized to false in step 801.

Processing transfers from step 801 to decision step 802 in which counter variable i is compared to num_trans. If i is greater than num_trans, i.e. the expected number of valid translations expected in the current leaf node, then processing transfers from decision step 802 to decision step 803 where the value of boolean variable "found" is examined. If "found" equals false, indicating that the desired translation was not found, then processing transfers to step 809 where table walker 115 generates an interrupt indicating to the operating system that the desired translation was not found in translation table 116 and causing the operating system to take appropriate action. Otherwise, processing transfers to step 804 where processing terminates.

If i is not greater than num_trans then processing transfers from decision step 802 to decision step 806 where the valid bit contained in the next (i.e. for i=1, the first) 24 bytes (i.e. the next translation descriptor) of the requested cache line is examined by table walker 115. If the valid bit is not set (thereby indicating that the translation descriptor is not valid) processing transfers from step 806 to step 805 where table walker 115 generates an interrupt to cause the operating system to start executing and to inform the operating system that the cause of the interrupt was the fact that the number of valid translations found in the current leaf node was less than the number expected, i.e. the number stored in variable "num_trans" in step 801.

If the valid bit is set then processing transfers from step 806 to step 807, where boolean variable "found" is set to true if the input address stored in the first 8 bytes of the currently examined translation descriptor (i.e. the 24 bytes of the requested cache line referred to in step 806) is equal to X, the input address for whose translation table walker 115 is searching. From step 807 processing transfers to step 808 where table walker 115 initiates an INSERTION operation in TLB 101 in order to insert data contained in (and/or, in some embodiments, computed from) the first 8 bytes (input address) and the last 16 bytes (output data) of the translation descriptor received from the memory currently examined by table walker 115 into an entry of CAM 102 and the corresponding entry of SRAM, respectively. (As described above, the TLB INSERTION operation is designed to prevent the insertion of a duplicate entry.) Also, in step 808 counter variable i is incremented by 1. From step 808 processing transfers to step 802. After table walker 115 has processed a leaf node of the translation tree, the requested translation data corresponding to input address X will have been entered into TLB 101 (assuming it was found in the leaf node; if not an interrupt is generated as described above) as well as the translation data corresponding to up to four other input addresses.

The extra time required to insert unrequested translations stored in the same translation tree leaf node as the requested translation is small in comparison to the total time required to locate the requested translation. Given the locality of reference exhibited by most programs (i.e. if a program references input address X it is likely to reference input addresses close to X in the near future) and the fact that a leaf node of the translation tree stores translations for closely located input addresses, insertion of unrequested translations should lower the miss rate in the TLB and thus decrease the average time required to perform an address translation. In effect, the cost of performing a search of translation table 116 may be amortized over two or more translations.

This disclosure contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Microfiche Appendix A contains AIDA source code (RTL) files which when compiled produce a flattened netlist file. The compilation uses a conventional technology library containing a macro definition for each macro invoked in the AIDA RTL files. Using a translation tool, the netlist file can be converted into an input file for the GARDS placement and routing tool sold by Silverlisco. The output of the GARDS tool can be used to produce masks to fabricate an integrated circuit for a translation lookaside buffer and a table walker. On frame 3, of Appendix A is a function specification document for a macro called BVLBCAM which is the CAM portion of a table lookaside buffer.

Printed Appendix B consists of two papers, "Architecture Overview of HaL Systems" and "Microarchitecture of HaL's Memory Management Unit", and 3 parts of the HaL Memory Management Compendium version 4.4 (section 2.1: "Basic Concepts"; chapter 4: "MMU Data Structures" and chapter 10: "View Lookaside Buffer") of Hal Computer Systems, Inc., that describe various aspects of a computer system which may include the present invention.

This disclosure is illustrative and not limiting; further modifications will be apparent to one skilled in the art are intended to fall within the scope of the appended claims.

What is claimed is:

1. An apparatus for address translation in a computer system that includes a memory, said memory storing a B-tree data structure that contains leaf nodes and index nodes, each of said leaf nodes storing at least one translation and each of said index nodes storing at least one pointer pointing to another node of said B-tree data structure, said apparatus comprising:

a node pointer examiner, whereby said node pointer examiner determines whether a node of said B-tree data structure pointed to by the node address field of a node pointer is a leaf node or an index node;

an index node retriever/processor operatively coupled to said memory and said node pointer examiner, whereby said index node retriever/processor retrieves from said memory and processes said node of said B-tree data structure if said node pointer examiner determines that said node of said B-tree data structure is an index node; and a leaf node retriever/processor operatively coupled to said memory and said node pointer examiner, whereby said leaf node retriever/processor retrieves from said memory and processes said node of said B-tree data structure if said node pointer examiner determines that said node of said B-tree data structure is a leaf node;

wherein said leaf node retriever/processor retrieves said node and inserts each translation stored in said node of said B-tree data structure into a translation buffer only if a search of said translation buffer finds more than one or none valid entries in said translation buffer storing said translation.

* * * * *